(12) United States Patent
Deval et al.

(10) Patent No.: US 11,403,137 B2
(45) Date of Patent: Aug. 2, 2022

(54) METHOD AND APPARATUS FOR SECURE DATA CENTER BRIDGING IN A MULTI-TENANT SYSTEM

(71) Applicant: Intel Corporation, Santa Clara, CA (US)

(72) Inventors: Manasi Deval, Portland, OR (US); Neerav Parikh, Hillsboro, OR (US); Robert O. Sharp, Austin, TX (US); Gregory J. Bowers, Hillsboro, OR (US); Ryan E. Hall, Hillsboro, OR (US); Chinh T. Cao, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 142 days.

(21) Appl. No.: 16/594,819

(22) Filed: Oct. 7, 2019

(65) Prior Publication Data

US 2020/0042350 A1 Feb. 6, 2020

Related U.S. Application Data

(60) Provisional application No. 62/743,932, filed on Oct. 10, 2018.

(51) Int. Cl.
| | | |
|---|---|---|
| G06F 9/455 | (2018.01) | |
| G06F 9/48 | (2006.01) | |
| G06F 9/50 | (2006.01) | |

(52) U.S. Cl.
CPC ........ G06F 9/4881 (2013.01); G06F 9/45558 (2013.01); G06F 9/5027 (2013.01); G06F 9/5077 (2013.01); *G06F 2009/4557* (2013.01); *G06F 2009/45579* (2013.01); *G06F 2009/45595* (2013.01)

(58) Field of Classification Search
CPC .................................................. G06F 9/45558
USPC ............................................................ 718/1
See application file for complete search history.

(56) References Cited

U.S. PATENT DOCUMENTS

| | | | | |
|---|---|---|---|---|
| 8,010,990 B2* | 8/2011 | Ferguson | ................ | H04L 47/20 726/1 |
| 8,027,354 B1* | 9/2011 | Portolani | ................ | H04L 49/70 370/431 |
| 10,860,358 B2* | 12/2020 | To | .......................... | H04L 47/828 |
| 2002/0054603 A1* | 5/2002 | Musoll | .................. | H04L 49/901 370/412 |
| 2002/0080808 A1* | 6/2002 | Leung | ................ | H04L 47/2458 370/412 |

(Continued)

*Primary Examiner* — Mehran Kamran
(74) *Attorney, Agent, or Firm* — Compass IP Law, PC (57) ABSTRACT

Tenant support is provided in a multi-tenant configuration in a data center by a Physical Function driver communicating a virtual User Priority to a virtual traffic class mapper to a Virtual Function driver. The Physical Function driver configures the Network Interface Controller to map virtual User Priorities to Physical User Priorities and to enforce the Virtual Function's limited access to Traffic Classes. Data Center Bridging features assigned to the physical network interface controller are hidden by virtualizing user priorities and traffic classes. A virtual Data Center Bridging configuration is enabled for a Virtual Function, to provide access to the user priorities and traffic classes that are not visible to the Virtual Function that the Virtual Function may need.

24 Claims, 9 Drawing Sheets

(56) References Cited

U.S. PATENT DOCUMENTS

| | | | |
|---|---|---|---|
| 2007/0091800 A1* | 4/2007 | Corcoran | H04B 3/542 370/230 |
| 2008/0089237 A1* | 4/2008 | Molen | H04L 47/10 370/252 |
| 2010/0303075 A1* | 12/2010 | Tripathi | G06F 13/385 370/392 |
| 2013/0155859 A1* | 6/2013 | Kwan | H04L 49/9005 370/235 |
| 2013/0308648 A1* | 11/2013 | Shamis | H04L 47/31 370/395.53 |
| 2014/0307554 A1* | 10/2014 | Basso | H04L 49/351 370/235 |
| 2015/0172183 A1* | 6/2015 | DeCusatis | H04L 45/74 370/392 |
| 2015/0263975 A1* | 9/2015 | Srinivasan | H04L 12/28 370/235 |
| 2015/0381510 A1* | 12/2015 | DeCusatis | H04L 47/24 370/235 |
| 2016/0112305 A1* | 4/2016 | Djekic | H04L 47/6215 370/235 |
| 2017/0207929 A1* | 7/2017 | Qian | H04L 45/74 |
| 2019/0087214 A1* | 3/2019 | To | H04L 41/0806 |
| 2019/0089637 A1* | 3/2019 | To | H04L 49/70 |
| 2019/0089640 A1* | 3/2019 | To | H04L 12/462 |
| 2021/0111951 A1* | 4/2021 | Ali | H04L 67/1097 |
| 2021/0226935 A1* | 7/2021 | Mundt | H04L 63/0478 |

\* cited by examiner

METHOD AND APPARATUS FOR SECURE DATA CENTER BRIDGING IN A MULTI-TENANT SYSTEM

RELATED APPLICATIONS

The present application claims the benefit of a priority date of U.S. provisional patent application Ser. No. 62/743,932, filed Oct. 10, 2018, the entire disclosure of which is incorporated herein by reference.

BACKGROUND

Computing services such as virtualized compute, network and storage may be hosted by a cloud service provider in a multi-tenant configuration in a data center. Physical and virtual resources in the data center may be dynamically assigned and reassigned to tenants according to demand.

Tenants using computing services in the data center may be isolated from each other through the use of virtual machines. The virtual machine provides the functionality to execute a guest operating system. A hypervisor (virtual machine monitor) creates and runs virtual machines, manages the execution of guest operating systems and manages access to the shared hardware in the data center by presenting each guest operating system with a virtual operating platform.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DESCRIPTION OF EMBODIMENTS

The Peripheral Component Interconnect-Special Interest Group (PCI-SIG) single root I/O virtualization (SR-IOV) specification defines extensions to the PCI Express (PCIe) specification suite that enable multiple guest operating systems in virtual machines to share the same physical hardware resources in a network interface controller. The network interface controller's hardware resources may be logically partitioned and exposed to a virtual machine as a separate PCI function called a Virtual Function.

Intel Scalable IOV is a new approach to hardware-assisted I/O virtualization that enables highly scalable and high performance sharing of Input/Output devices across isolated domains. Unlike the coarse-grained device partitioning approach adopted by SR-IOV to create multiple Virtual Functions on a Physical Function, Intel Scalable IOV enables software to flexibly compose virtual devices utilizing the hardware assists for device sharing at finer granularity.

A Virtual Function has basic access to physical hardware resources, such as queue resources and control resources of queues in the network interface controller that are assigned to it. Virtual functions operate under the respective Physical Function on the same port in the network interface controller and have no access to the network interface controller's global resources that are shared between other Virtual Functions for the same port. For global resource access, a Virtual Function has to send a request to a Physical Function for that port, and the Physical Function operates on the global resources on behalf of the Virtual Function.

The Institute of Electrical and Electronics Engineers (IEEE) 802.1 Data Center Bridging is a collection of standards that includes the coexistence of Local Area Network based and Storage Area Network based applications over the same networking fabric within the data center. Data Center Bridging includes the Enhanced Transmission Selection standard and the Priority-based Flow Control standard.

Enhanced Transmission Selection allocates bandwidth between traffic classes that are assigned to different IEEE 802.1p priority levels. Each traffic class is allocated a percentage of available bandwidth on the data link between directly connected peers. If a traffic class doesn't use its allocated bandwidth, Enhanced Transmission Selection allows other traffic classes to use the available unused allocated bandwidth. Enhanced Transmission Selection ensures fairness by allowing a minimum amount of bandwidth to be allocated to traffic classes that are assigned to different IEEE 802.1p priority levels.

Priority-based Flow Control supports the reliable delivery of data by substantially reducing packet loss due to congestion by allowing a receiver to pause a transmitter for any IEEE 802.1p priority level.

Converged Ethernet is an Ethernet network that carries both Local Area Network traffic and non-Local Area Network traffic that requires a no-drop guarantee. Converged Ethernet must therefore provide a no-drop guarantee for non-Local Area Network traffic while allowing LAN traffic to be unaffected by the no-drop guarantee. DCB's Priority-based Flow Control provides this capability because it allows traffic on one TC to be paused, while traffic on other TCs continues. Converged Ethernet allows remote direct memory access (RDMA) to use Ethernet as the underlying transport.

RDMA over Converged Ethernet (RoCE) is a network protocol that allows RDMA over a Local Area Network and may be achieved by means of Data Center Bridging. RDMA over Converged Ethernet requires a reliable transport, which Data Center Bridging provides via Priority-based Flow Control.

Data Center Bridging features such as Enhanced Transmission Selection and Priority-based Flow Control are assigned to a physical network interface controller not to a Virtual Function. However, the Virtual Function may need access to the Data Center Bridging features that are assigned to the physical network interface controller.

In an embodiment, Data Center Bridging features assigned to the physical network interface controller are hidden by virtualizing user priorities and traffic classes. A virtual Data Center Bridging configuration is enabled for a Virtual Function, to provide access to the user priorities and traffic classes that are not visible to the Virtual Function and that the Virtual Function may need.

Tenant support is provided in a multi-tenant environment (multi-tenant configuration) in a data center by a Physical Function driver communicating a virtual User Priority to a virtual Traffic Class mapping to a Virtual Function driver. The Physical Function driver configures the Network Interface Controller to map virtual User Priorities to Physical User Priorities and to enforce the Virtual Function's limited access to Traffic Classes. A Physical Function can be a traditional network device Physical Function, or a similar hardware construct, accessible by the virtual function. This Physical Function or similar construct can be exposed to a host operating system or reside inside a network interface controller.

Tenant Data Center Bridging is one of a class of technologies that allows virtual switch features to be offloaded to hardware (for example, a Network Interface Controller). This allows cloud service providers to provide a Service Level Agreement (SLA), and meter and charge customers ("tenants") for Virtual Function usage.

In an embodiment, Tenant Data Center Bridging can be used in a data center that uses a cloud computing service, for example, Microsoft® Azure® or Amazon Web Services® (AWS®) to manage applications and services. In other embodiments, Tenant Data Center Bridging can be used in a Hybrid Data Center or in an Edge data center that processes data near the edge of the network where data is being generated. Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Figure 1A:
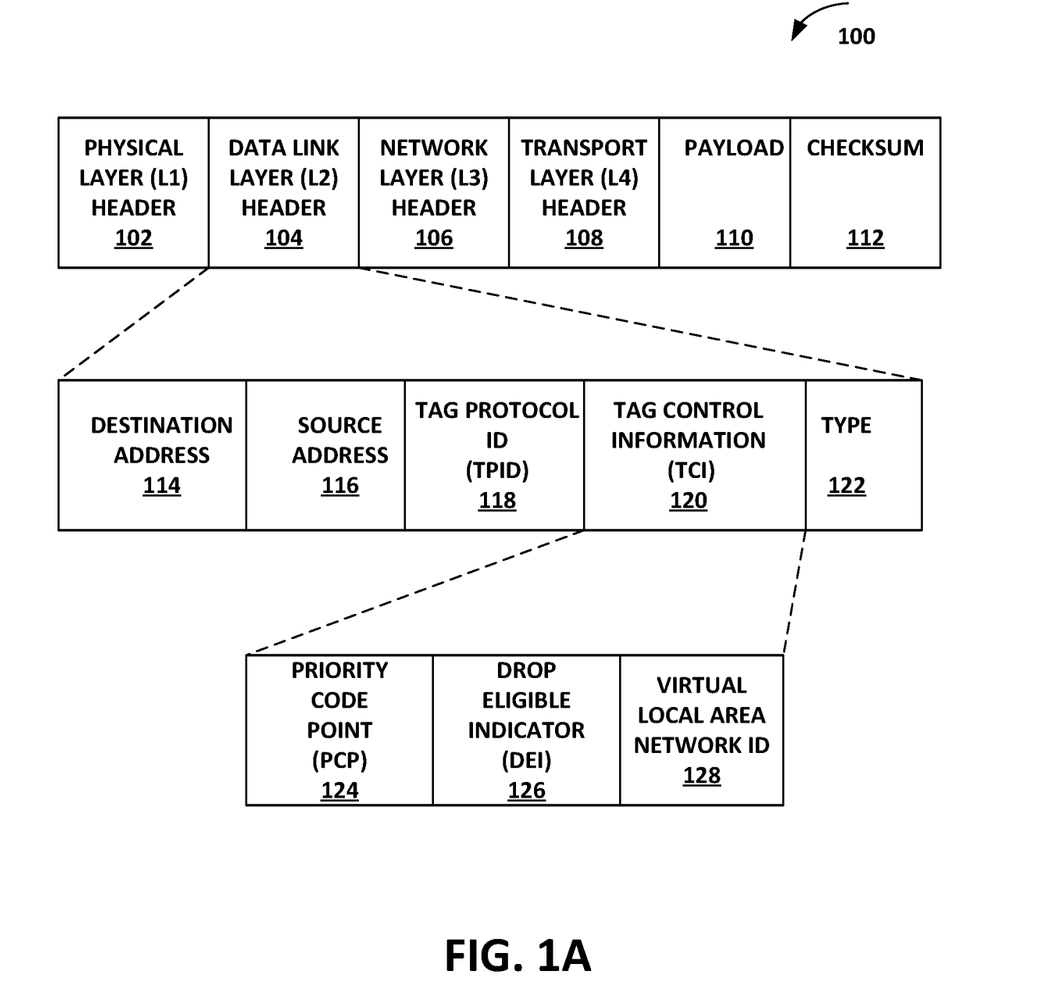
FIGS. 1A-1C illustrate a data packet that includes four layers of the OSI model.
Figure 1B:
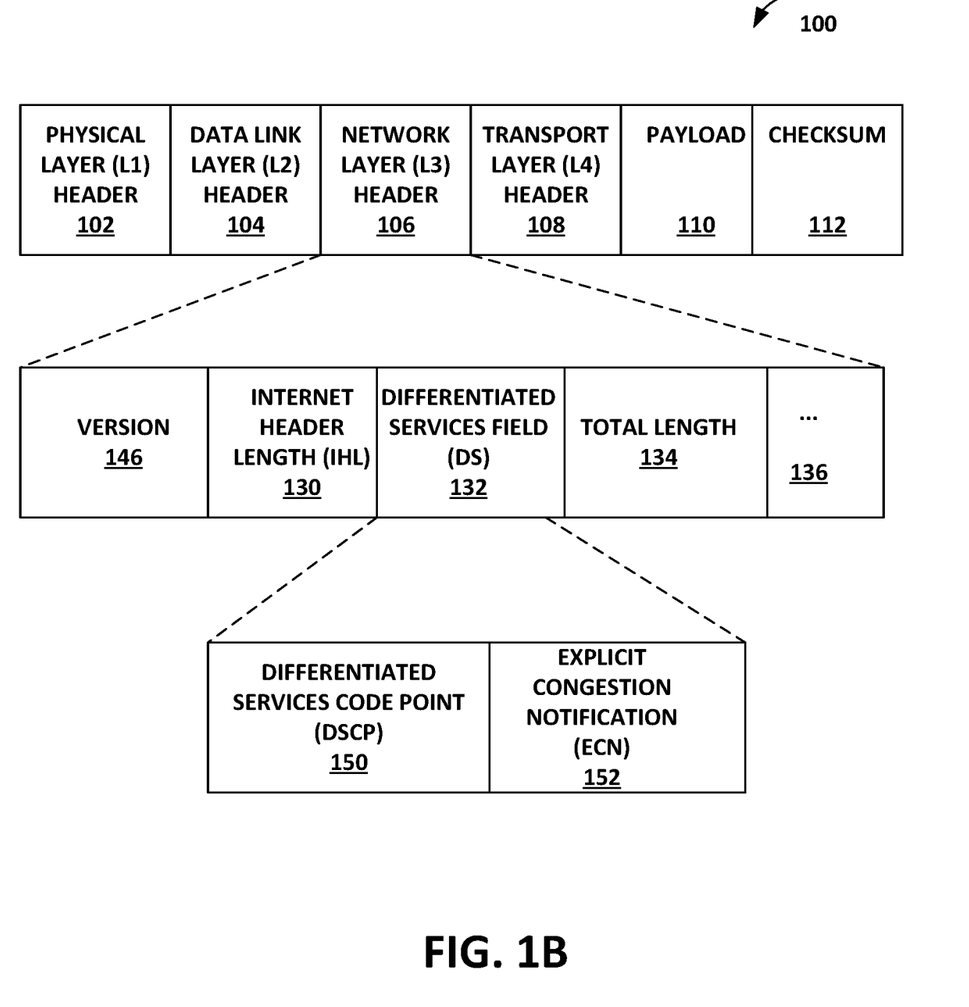
Figure 1C:
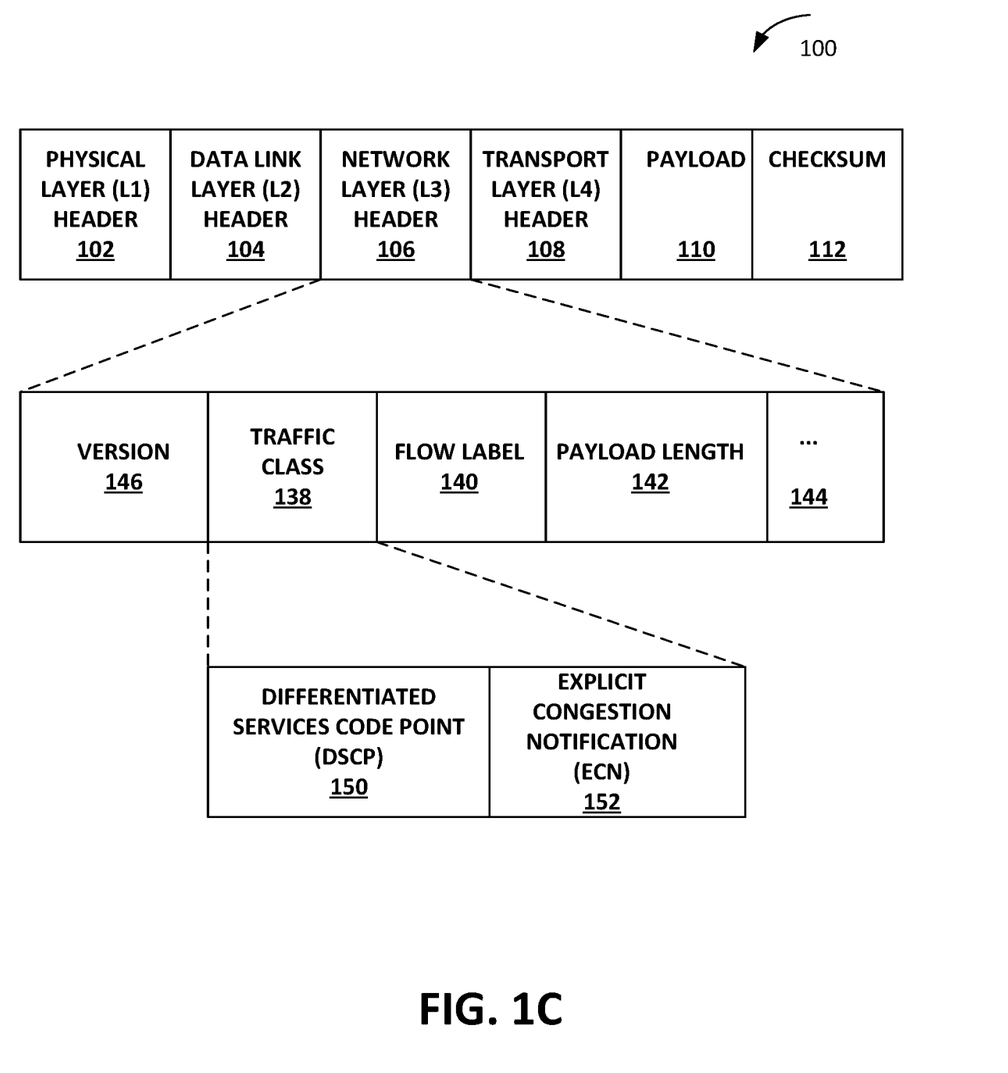

The Open Systems Interconnection model (OSI model) is a conceptual model that partitions a communication system into abstraction layers. FIGS. 1A-1C illustrate a data packet that includes four layers of the OSI model. Referring to FIG. 1A, the data packet 100 includes a payload field 110, a checksum 112 and a header for each of the four layers of the OSI model, a physical layer (L1) header 102, a media access control (MAC) layer (L2) header 104, a networking layer (L3) header 106 and a transport layer (L4) header 108. In an embodiment, the media access control (MAC) layer (L2) header 104 may be an Ethernet header, the networking layer (L3) header 106 may be an Internet Protocol ("IP") header and the transport layer (L4) header 108 may be Transmission Control Protocol ("TCP").

In an embodiment in which the media access control (MAC) layer (L2) header 104 is an Ethernet header, the media access control (MAC) layer (L2) header 104 includes a destination address 114, a source address 116, an IEEE 802.1q Tag Protocol IDentifier (TPID) field 118, an IEEE 802.1q Tag Control Information (TCI) field 120 and a length/type field 122. The TPID field is a 16-bit field that is set to a value of 0x8100 to identify the Ethernet frame as an IEEE 802.1Q-tagged frame.

The 16-bit TCI field 120 includes a 3-bit priority code point field 124, a 1-bit Drop Eligible Indicator field 126 and a 12-bit Virtual Local Area Network ("VLAN") identifier 128. The Virtual Local Area Network identifier (VID) identifies the VLAN to which the Ethernet frame belongs.

The priority code point field 124 refers to the IEEE 802.1p class of service and maps to an Ethernet frame priority level. Different Priority Code Point values can be used to prioritize different classes of traffic over a network. Priority Code Point is a mechanism for implementing quality of service (QoS) at the MAC layer. Eight different classes of service (0 (lowest priority) through 7 (highest priority) based on traffic type are available through the 3-bit priority code point field 124. The traffic types in order of priority are background (0 (lowest priority), best effort, excellent effort, critical applications, video (<100 milli seconds (ms) latency and jitter), voice (<10 ms latency and jitter, internetwork control and network control (7 (highest priority)).

The user priority stored in the Priority Code Point field 124 is one of 8 priority levels, with 7 being the highest priority and 1 being the lowest priority. A priority level of 0 is the default priority.

The Drop Eligible Indicator field 126 may be used separately or in conjunction with the Priority Code Point field 124 to indicate Ethernet frames eligible to be dropped in the presence of congestion.

Referring to FIG. 1B, in an embodiment in which the networking layer (L3) header 106 is Internet Protocol ("IP") version 4, the networking layer (L3) header 106 includes a version field 146 that stores the IP version, an Internet Header length (IHL) field 130, a differentiated services (DS) field 132 and a total length field 134. The differentiated services (DS) field 132 includes a Differentiated Services Code Point field (DSCP field) 150 and an explicit congestion notification (ECN) field 152.

Referring to FIG. 1C, in an embodiment in which the networking layer (L3) header 106 is Internet Protocol ("IP") version 6 Internet Protocol header, the networking layer (L3) header 106 includes a version field 146 that stores the IP version, a Traffic Class field 138, a Flow Label field 140 and a payload length field 142. The Traffic Class field 138 includes Differentiated Services Code Point (DSCP) field 150 and explicit congestion notification (ECN) field 152.

Data Center Bridging bandwidth features are limited to reservations (also referred to as allocations, guarantees or shares) per traffic class, but do not include a means to limit bandwidth per traffic class. In an embodiment, secure Data Center Bridging with virtualization is provided by allowing Virtual Functions to transmit an allowable amount of traffic without any knowledge of the physical network and thus the Virtual Function has no means to modify physical port configuration or the physical network. Data Center Bridging features assigned to the physical network interface controller are hidden by virtualizing user priorities and traffic classes.

In order to prevent Virtual Functions from acting maliciously, Virtual Functions may be rate-limited in the network interface controller.

Figure 2:
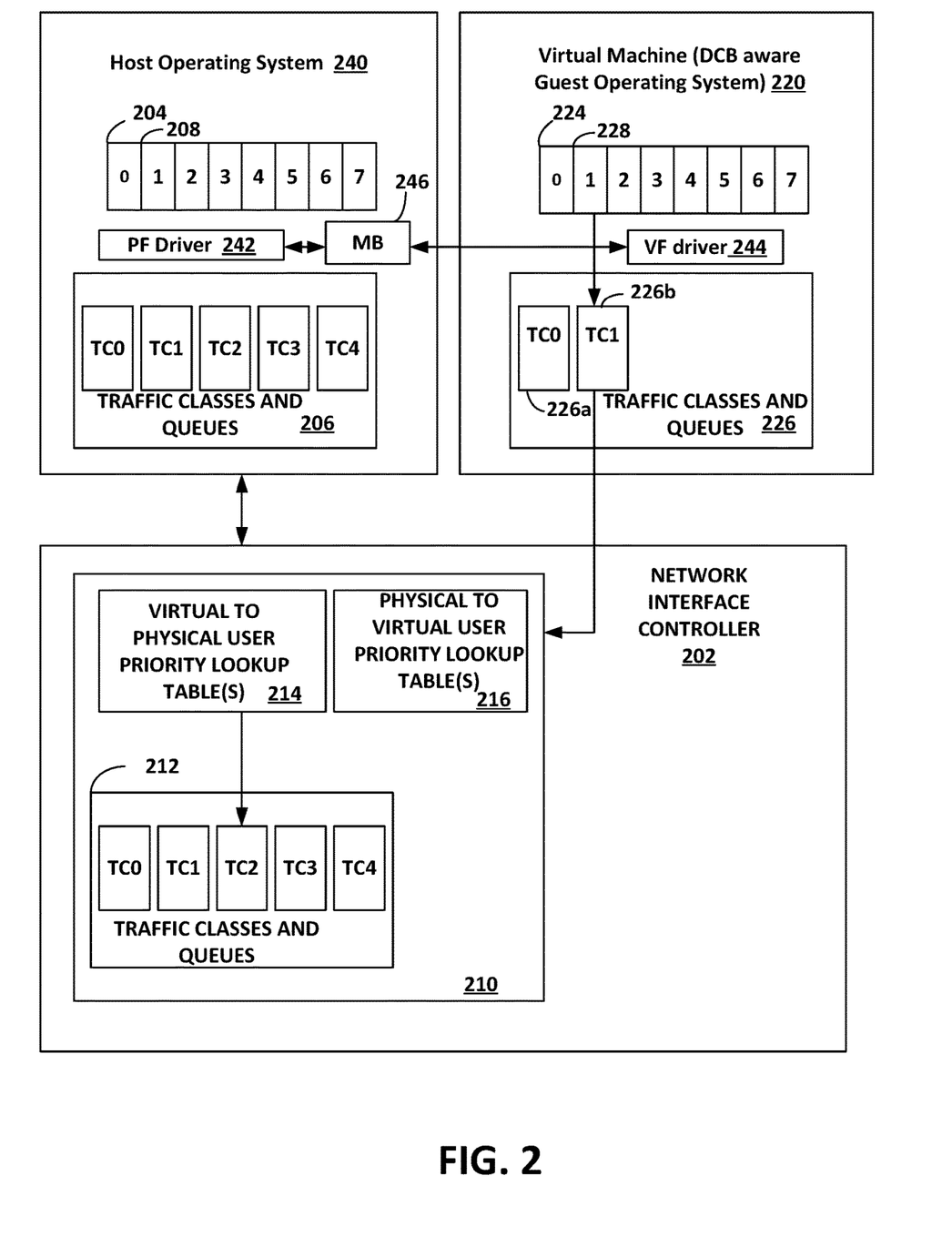
FIG. 2 is an example of a system that includes a Physical Function driver in a host operating system, a Virtual Function driver in a virtual machine and a network interface controller to perform secure Data Center Bridging.

FIG. 2 is an example of a system that includes a Physical Function driver 242 in a host operating system 240, a Data Center Bridging aware guest operating system in virtual machine 220 and a network interface controller 202 to perform secure Data Center Bridging in a transmit path. The virtual machine 220 includes a Virtual Function user priority table 224 and Virtual Function traffic classes and queues 226. An entry 228 in the Virtual Function user priority table 224 is used to map a virtual user priority to a traffic class in the virtual traffic classes and queues 226.

In the system shown in FIG. 2, five traffic classes (TC0-TC4) in physical traffic classes and queues 206 are available for use by the Physical Function driver 242 and in the network interface controller 202. However, in the example shown in FIG. 2, only two traffic classes (TC0-TC1) are available for use by the Virtual Function driver 244 in the Virtual Function traffic classes and queues 226.

For each transmit packet, a virtual user priority value can be inserted in the packet by the Virtual Function driver 244. Prior to transmitting the packet, the virtual user priority value specified by the Virtual Function driver 244 is replaced in the packet by packet parsing and modification circuitry 210 in the network interface controller 202 with the corresponding physical user priority for the traffic class that is stored in a virtual to physical user priority lookup table 214 in packet parsing and modification circuitry 210 in the network interface controller 202. As discussed in conjunction with FIG. 1, the TPID field 118 in the media access control (MAC) layer (L2) header 104 is set to a value of 0x8100 to identify the packet as an IEEE 802.1Q-tagged packet and the user priority is stored in the priority code point field 124 of the Ethernet frame.

Upon detecting that the Virtual Function driver 244 is sending a IEEE 802.1Q-tagged ("tagged") packet, the packet parsing and modification circuitry 210 replaces the Virtual Function user priority that is stored in the priority code point field 124 of the packet with a Physical Function user priority for the traffic class stored in a virtual to physical user priority lookup table 214 in the packet parsing and modification circuitry 210 in the network interface controller 202.

The system may have a plurality of Virtual Functions and each Virtual Function has a physical to virtual user priority lookup table 216 and a virtual to physical user priority lookup table 214. The Physical Function driver 242 writes the data to the virtual to physical user priority lookup table 214 and the physical to virtual user priority lookup table 216 in the network interface controller 202. Each Virtual Function driver 244 may have a different virtual to physical user priority mapping. In order to hide details about the physical network from the Virtual Function, the Virtual Function driver 244 cannot directly access the virtual to physical user priority lookup table 214 and the physical to virtual user priority lookup table 216.

Figure 3:
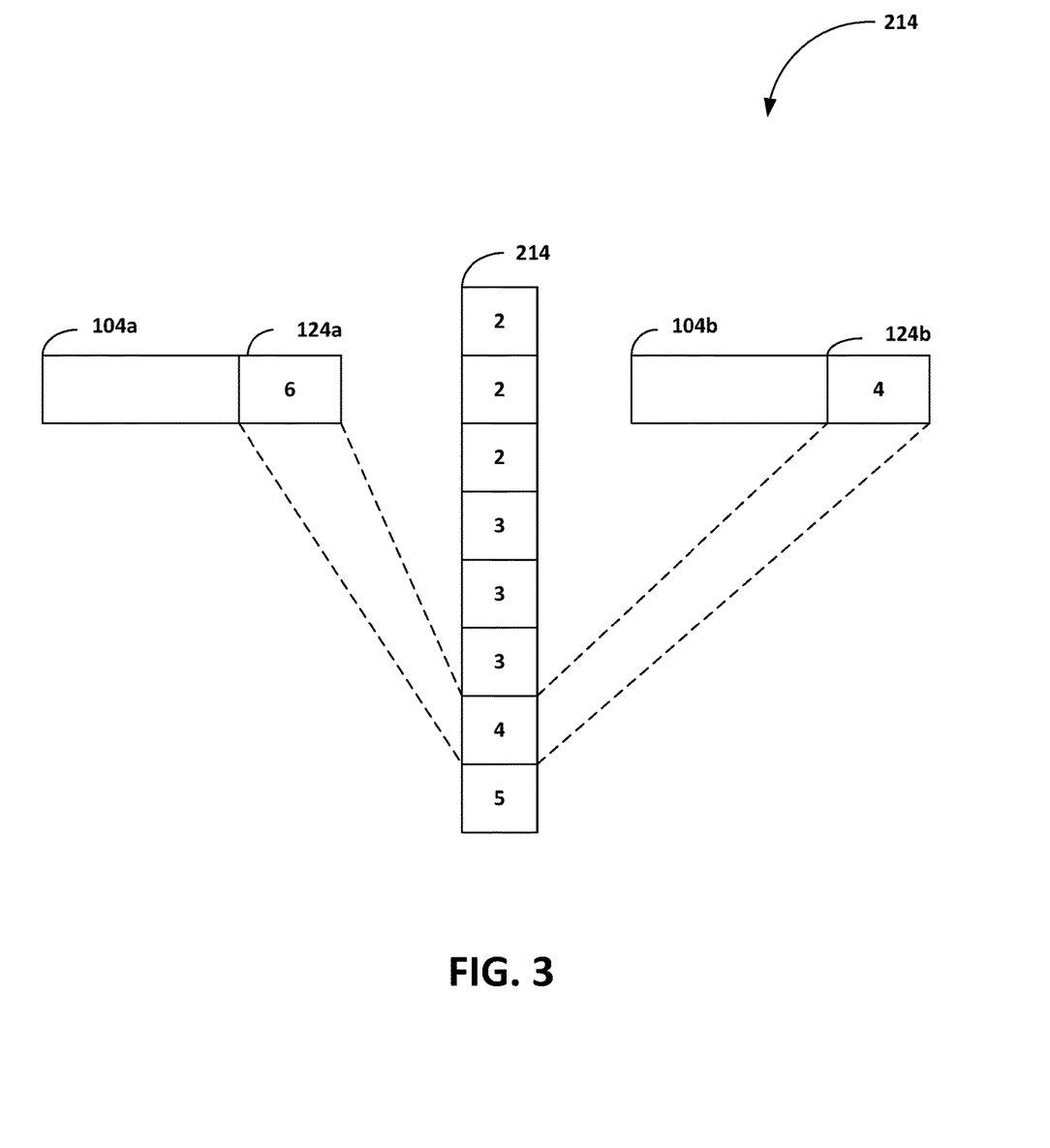
FIG. 3 is an example of the use of a virtual to physical user priority lookup table in the transmit path in packet parsing and modification circuitry in the network interface controller.

FIG. 3 is an example of the use of a virtual to physical user priority lookup table 214 in the transmit path in packet parsing and modification circuitry 210 in the network interface controller 202. The network interface controller 202 includes packet parsing and modification circuitry 210 to identify and modify packets to be transmitted to the network.

In an embodiment, packet parsing and modification circuitry 210 includes a virtual to physical user priority lookup table 214 used by the packet parsing and modification circuitry 210 to map virtual user priorities to physical user priorities.

For each packet received from the Virtual Function driver 244, the network interface controller 202 identifies the Virtual Function associated with the packet, and the virtual to physical user priority lookup table 214 associated with the virtual machine 220 and if the packet is a tagged packet, that is, has a virtual user priority value. Referring to FIG. 3, in the example shown, the value of the virtual user priority stored in the Priority Code Point field 124a of media access control (MAC) layer (L2) header 104a is '6'. The user priority is used to index the Virtual Function's virtual to physical user priority lookup table 214 which stores a physical user priority value of '4'. Prior to transmitting the packet to the network, the packet parsing and modification circuitry 210 in the network interface controller 202 replaces the virtual user priority ('6') in the packet with the corresponding physical user priority ('4') stored in the Virtual Function's virtual to physical remapping table 216.

Figure 4:
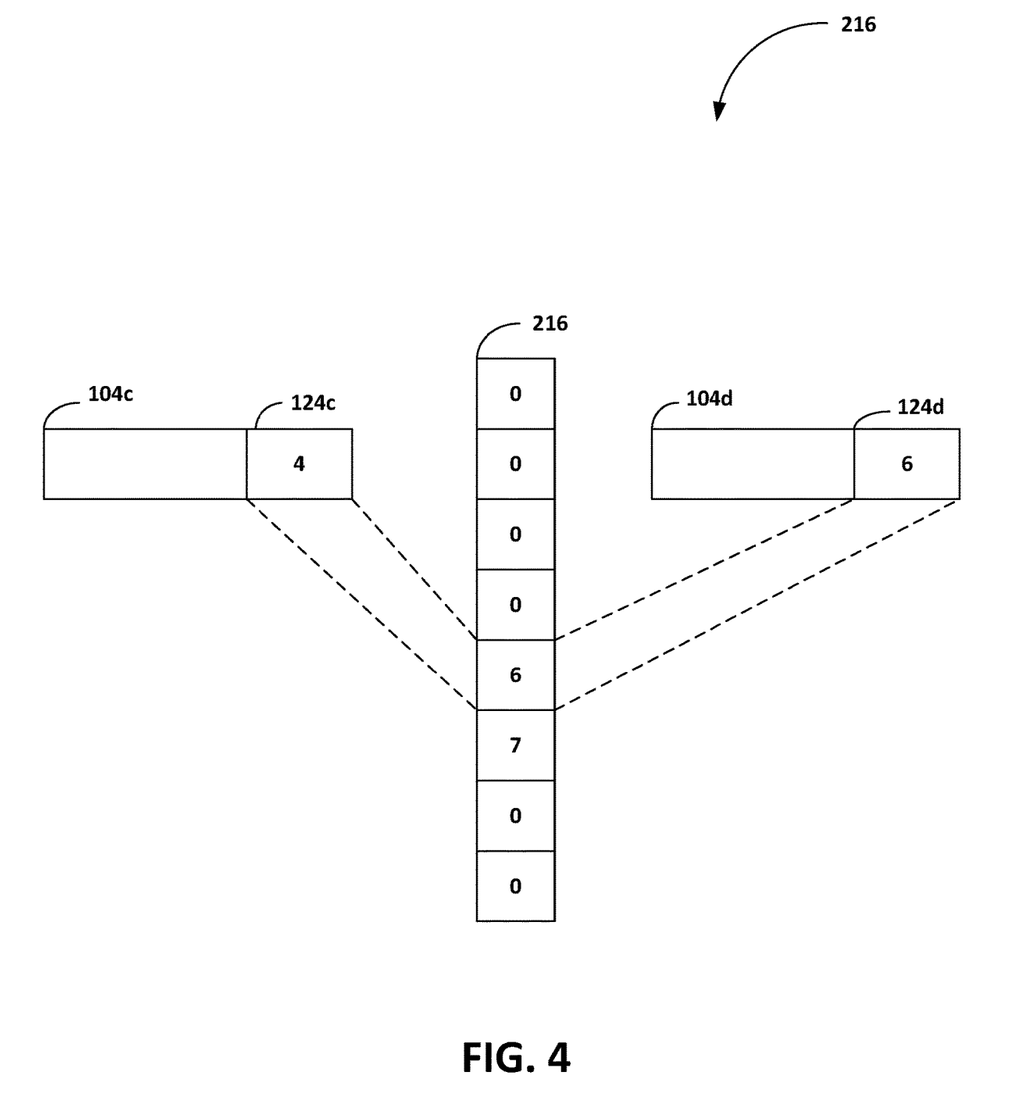
FIG. 4 is an example of the use of a physical to virtual user priority lookup table in the receive path in packet parsing and modification circuitry in the network interface controller.

FIG. 4 is an example of the use of a physical to virtual user priority lookup table 216 in the receive path in packet parsing and modification circuitry 210 in the network interface controller 202. The network interface controller 202 includes packet parsing and modification circuitry 210 to identify and modify received packets.

In an embodiment, packet parsing and modification circuitry 210 includes a physical to virtual user priority lookup table 216 used by the packet parsing and modification circuitry 210 to map physical user priorities to virtual user priorities.

For each packet received from the network, the network interface controller 202 identifies the Virtual Function associated with the packet, and if the packet is a tagged packet, that is, has a user priority value. Referring to FIG. 4, in the example shown, the value of the physical user priority stored in the Priority Code Point field 124c of media access control (MAC) layer (L2) header 104 is '4'. The user priority is used to index the Virtual Function's physical to virtual user priority lookup table 216 which stores a virtual user priority value of '6'. Prior to forwarding the packet to the identified Virtual Function, the packet parsing and modification circuitry 210 in the network interface controller 202 replaces the physical user priority ('4') in the packet with the corresponding virtual user priority ('6') stored in the Virtual Function's physical to virtual user priority lookup table 216.

The physical to virtual user priority mapping may be ambiguous for received packets, meaning a physical user priority may not always map to one virtual user priority. When a virtual to physical user priority mapping is one to one, that is each virtual user priority has the same value as its corresponding physical user priority, an entry in the physical to virtual user priority lookup table 216 maps the physical user priority to the corresponding virtual user priority. If there is not a one-to-one mapping, all entries in the physical to virtual user priority lookup table 216 are set to zero so that the user priority values in all packets are set to zero. The priority level of 0 is the default priority.

In another embodiment, when only one virtual user priority maps to a physical user priority, an entry in the physical to virtual user priority lookup table 216 maps the physical user priority to the corresponding virtual user priority. If multiple virtual user priorities map to a physical user priority the entry in the physical to virtual user priority lookup table 216 is set to zero so that the user priority value in the packet is set to zero. The priority level of 0 is the default priority.

Returning to FIG. 2, Data Center Bridging parameters are configured for the Physical Function driver 242 in the network interface controller 202. A subset of the Physical Function's traffic classes may be exposed for use by the Virtual Function driver 244. Each Virtual Function driver 244 has access to a dedicated set of registers, separate from the Physical Function driver 242 or other Virtual Function driver's registers. In an embodiment, a Virtual Function driver 244 can communicate with the Physical Function driver 243 by using some of its registers as a mailbox. The Physical Function driver 242 or the hardware determines which entity (for example, the Physical Function driver 242 associated with the Virtual Function driver 244) is connected to the other side of the mailbox, and handles the Virtual Function driver's communication. That entity provides resources, such as hardware queues, to the Virtual Function driver 244.

The Physical Function driver 242 has a set of virtualized Data Center Bridging parameters for the exposed subset of traffic classes. The Physical Function driver 242 may communicate the virtualized Data Center Bridging parameters to the Virtual Function driver 244 using a secure mailbox queue 246. The parameters communicated to the Virtual Function driver 244 include the number of virtualized traffic classes available, the capabilities of each virtualized traffic class such as scheduling mode and bandwidth allocation, a mapping from virtualized user priority values to virtualized traffic classes and an indication of which user priorities are Priority-based Flow Control enabled. An embodiment may choose to include an Application Priority Table in the parameters. Each element in the Application Priority table indicates the virtual user priority that may be used to classify a type of traffic (for example, RDMA). These elements may also be referred to as Classification Elements.

A Physical Function driver typically resides in a host operating system 240 and manages one Physical Function. A Physical Function may control one or more physical network ports. A Virtual Function driver typically resides in a guest operating system running inside a virtual machine 220 and manages one Virtual Function. The Virtual Function appears as a device in the guest operating system in the virtual machine 220. The communication of Data Center Bridging parameters between a Physical Function driver in the host operating system 240 and a Virtual Function driver 244 in the guest operating system in the virtual machine 220 is performed transparently to the guest operating system. The host operating system 240 includes a Physical Function driver 242 that manages hardware, for example, a network interface controller 202. A Virtual Function driver 244 typically resides Virtual Function in a guest operating system running inside a virtual machine 220 and manages one Virtual Function. The Physical Function driver 242 may manage resources in the Virtual Function driver 244 using the secure mailbox queue 246.

The Virtual Function driver 244 advertises itself as Data Center Bridging capable to the guest operating system in the virtual machine 220 and provides the number of traffic classes that it received from the Physical Function driver 242 via the secure mailbox queue 246. The guest operating system in the virtual machine 220 can use the virtual network interface controller in the same way it would use a physical network interface controller, including using any user priority values.

When there is a change in the configuration of physical Data Center Bridging, in response to the change in the configuration, the Physical Function driver 242 sends a message via the secure mailbox queue 246 to the Virtual Function driver 244 to pause sending and receiving in the queues. The Physical Function updates the Virtual Function's Data Center Bridging configuration in the network interface controller (user priority replacement tables and queue configuration) and provides the new virtualized configuration to the Virtual Function driver 244. The Virtual Function driver 244 can then resume sending and receiving in the queues. If a Virtual Function driver 244 does not respond to messages from the Physical Function driver 242, the Physical Function driver 242 continues to apply the new Data Center Bridging configuration in order to avoid disrupting the operation of itself and other virtual machines on the system. The Physical Function driver 242 may reset the Virtual Function and Virtual Function driver 244.

The Physical Function driver 242 provides the Virtual Function driver 244 with data queues from the physical traffic classes and queues 206 for each virtualized traffic class. In one embodiment, physical traffic classes and queues 206 are mapped to a Virtual Function driver 244 via an indexed table (for example, user priority is used to index the Virtual Function's physical to virtual user priority lookup table 216), such that the Virtual Function driver 244 accesses a contiguous set of queues from its point of view, while each queue may be any from the range controlled by the Physical Function driver 242. The Physical Function driver 242 allocates queues in a dynamic manner, so that the number of queues in the virtual function traffic classes and queues 226 in virtual machine 220 may be changed dynamically without any queue fragmentation problems.

The Physical Function driver 242 configures the hardware to map hardware queues to the table. Each entry in the table may refer to any unique hardware queue, without any requirement that the underlying queues be contiguous. From the Virtual Function driver's 244 point of view, they are contiguous because the Virtual Function driver 244 uses the table indices to refer to the queues when communicating with hardware or the Physical Function driver 242. Any free queue may be used to satisfy a Virtual Function driver's queue needs.

In an embodiment with 128 hardware queues (0-127), Table 1 illustrates an example queue mapping for a first Virtual Function driver and Table 2 illustrates an example queue mapping for a second Virtual Function driver. Each Virtual Function driver refers to one of four queues index 0-3. The Physical Function driver 242 can map any hardware queue 0-127 to one table entry at a time.

TABLE 1

| Index | Hardware Queue |
|---|---|
| 0 | 23 |
| 1 | 1 |
| 2 | 120 |
| 3 | 99 |

TABLE 2

| Index | Hardware Queue |
|---|---|
| 0 | 17 |
| 1 | 46 |
| 2 | 100 |
| 3 | 102 |

When a Virtual Function driver 244 in the virtual machine 220 requests queues in the physical traffic classes and queues 206 from the Physical Function driver 242, the Physical Function driver 242 provides up to the requested number by configuring the network interface controller 202 with queues associated with the physical traffic classes and queues 206 in network controller traffic classes and queues 212. The Physical Function driver 242 communicates queue information, including the virtual traffic classes each queue is associated with, to the Virtual Function driver 244.

The Virtual Function driver 244 selects transmit queues based on virtual traffic classes. For example, if a packet is to be transmitted on virtual traffic class 1 (TC1), the Virtual Function driver 244 selects from one of the queues associated with virtual traffic class 1 226b. Changes to the physical Data Center Bridging configuration or the virtual Data Center Bridging configuration associated with the Virtual Function may require changes to the queues assigned to the Virtual Function driver 244.

When the Virtual Function traffic classes and queues 226 need to be reconfigured, the Physical Function driver 242 indicates that the Virtual Function driver 244 should pause all traffic, and which queues the Virtual Function driver 244 is to disable (alternatively, which queues the Physical Function driver is to disable). The Virtual Function driver 244 stops all traffic, disables the specified queues in Virtual Function traffic classes and queues 226 while the Virtual Function traffic classes and queues 226 are reconfigured in the Virtual Function driver 244, and confirms to the Physical Function driver 242. The Physical Function driver 242 configures the network interface controller 202, then provides the updated set of queues to the Virtual Function driver 244. This may be more or fewer queues than before the reconfiguration of the Virtual Function traffic classes and queues 226.

Figure 5:
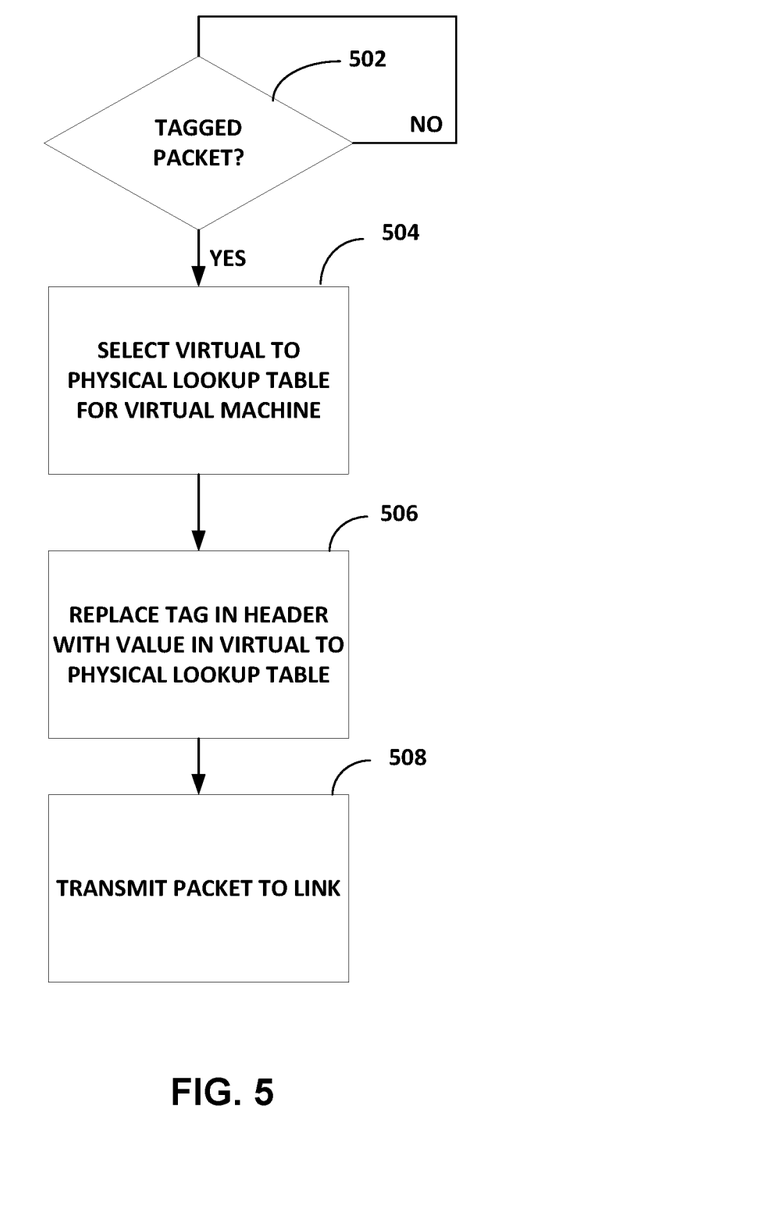
FIG. 5 is a flowgraph illustrating the transmit path for a packet received from the Virtual Function by the network interface controller to be transmitted over the network.

FIG. 5 is a flowgraph illustrating the transmit path for a packet received from the Virtual Function driver 244 by the network interface controller 202 to be transmitted over the network.

At block 502, if the received packet is a tagged packet, processing continues with block 504.

At block 504, the tag in the received tagged packet is used as the index to the virtual to physical user priority lookup table 214 associated with the virtual machine 220. Processing continues with block 506.

At block 506, the value stored at the indexed location in the virtual to physical user priority lookup table 214 associated with the virtual machine 220 is inserted in the packet. Processing continues with block 508.

At block 508, the packet with the inserted tag is transmitted over the network.

Figure 6:
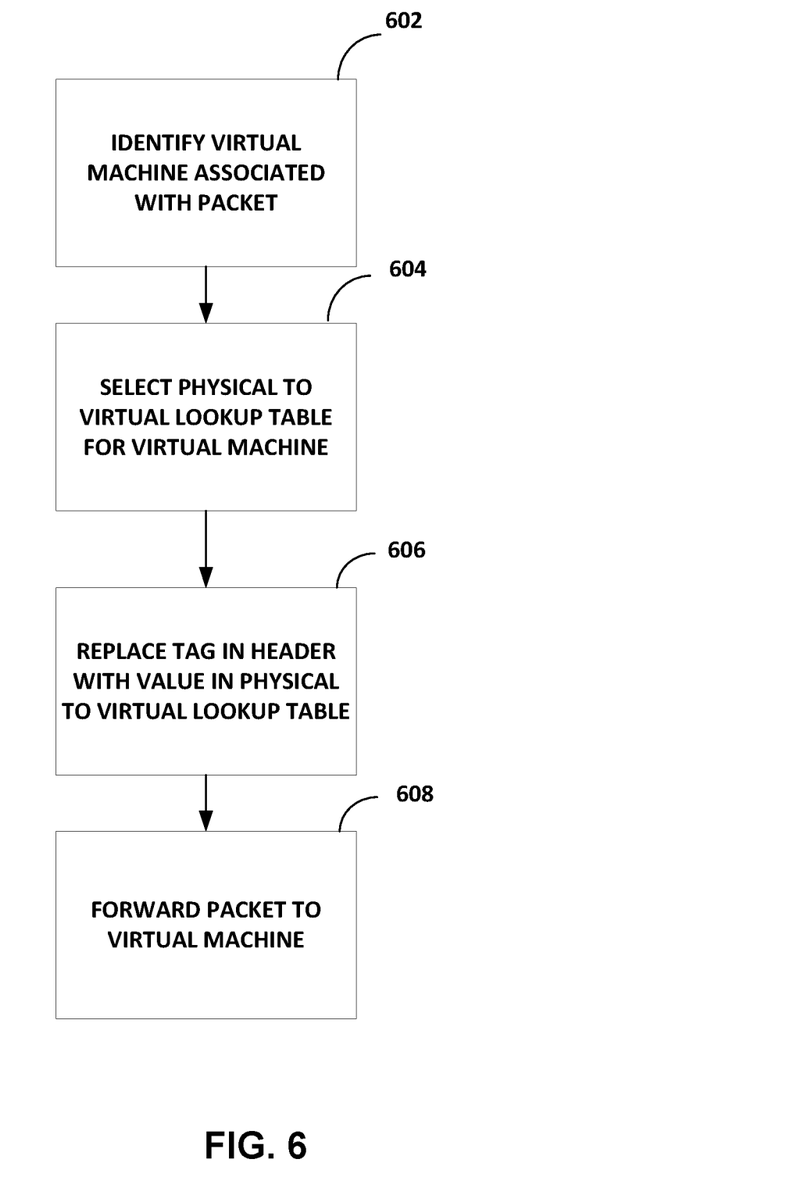
FIG. 6 is a flowgraph illustrating the receive path of a packet received by the network interface controller to the Virtual Function.

FIG. 6 is a flowgraph illustrating the receive path of a packet received by the network interface controller 202 to the virtual machine 220.

At block 602, the virtual machine 220 associated with the received packet is identified. Various filters or switch rules may be used to identify the virtual machine 220. For example, a filter/rule may map the destination address 114 (FIG. 1) to a virtual machine 220. Processing continues with block 604.

At block 604, the physical to virtual user priority lookup table 216 associated with the virtual machine 220 is selected. Processing continues with block 606.

At block 606, the value stored at the indexed location in the physical to virtual user priority lookup table 216 is inserted into the received packet. Processing continues with block 608.

At block 608, the received modified packet with the inserted tag is forwarded to the Virtual Function driver 244.

Data center bridging in a Virtual Function driver 244 may be supported at various levels with combinations of tenant Data Center Bridging and basic Data Center Bridging support. Basic Data Center Bridging refers to support for Data Center Bridging communication between the Physical Function in the host operating system 240 and the Virtual Function in the Virtual Machine 220.

Basic Data Center Bridging does not include support for tenant Data Center Bridging in either the host operating system or the guest operating system. Tenant Data Center Bridging refers to host operating system knowledge that Data Center Bridging is being virtualized on behalf of a tenant in the guest operating system. The tenant may have access to more than one traffic class when Data Center Bridging is supported in the guest operating system.

Tenant Data Center Bridging in both host operating system and guest operating system provides support for full Data Center Bridging virtualization as described in conjunction with the embodiment shown in FIG. 2.

Tenant Data Center Bridging in the host operating system 240 and basic Data Center Bridging in the guest operating system in the virtual machine 220 may provide support for a guest operating system to insert virtual user priority in packets, but this may not be as fully integrated with the guest operating system when compared to a guest operating system supporting tenant Data Center Bridging.

If there is basic Data Center Bridging in both the host operating system 240 and the virtual machine 220, physical to virtual mappings may be configured to limit Virtual Function classes to one Local Area Network traffic class and one or more application traffic classes. The application traffic classes may be associated with Remote Direct Memory Access (RDMA). The Physical Function driver 242 uses information from the host operating system to determine the Remote Direct Memory Access traffic classes and user priorities. Since the host operating does not support tenant Data Center Bridging, a Physical Function driver may allow an administrator to configure the physical to virtual Data Center Bridging settings outside of host operating system control. Given that, it is possible that all traffic classes may be enabled in all Virtual Functions, although this would remove the security benefits of Data Center Bridging virtualization.

If tenant or basic Data Center Bridging is supported in a host operating system 240 but no Data Center Bridging is supported in the virtual machine 220, the Physical Function driver 242 enables a single traffic class for the Virtual Function driver 244. The user priority is mapped in the guest operating system in the virtual machine 220 to a physical user priority associated with the single traffic class. The Physical Function associates all Virtual Function traffic classes and queues 226 with the single physical traffic class. The Virtual Function need not insert a tag in packets.

In another embodiment, an operating system model layer 3 header may be used, for example, Differentiated Services Code Point (DSCP) 150 in the Differentiated Services (DS) field 132 in an Internet Protocol header (IPv4 header) as shown in FIG. 1B or Differentiated Services Code Point (DSCP) 150 in Traffic Class field 138 in an Internet Protocol header (IPv6 header) as shown in FIG. 1C.

Any traffic, including RDMA traffic, may be separated by assigning to different physical traffic classes. A Virtual Function may be assigned transmit and receive queues for RDMA traffic that are associated with a physical traffic class that is different from the physical traffic class associated with queues for another Virtual Function's RDMA traffic. The physical traffic classes also have different physical user priorities mapped to them. Within the Virtual Functions, the virtualized traffic classes and user priorities may have the same values as other Virtual Functions, while the hardware knows the virtual to physical mapping details. Offloads, such as Remote Direct Memory Access (RDMA), may access physical traffic classes and support the virtual to physical mapping scheme. However, RDMA queue pairs, that is, a transmit and receive queue pair are managed differently. As Virtual Machine-based RDMA applications request queue pairs, the Virtual Function driver 244 creates queue pairs from a pool reserved for that Virtual Function driver 244. In an embodiment, as with queues in Virtual Function traffic classes and queues 226, RDMA queue pairs may be zero-based. The network interface controller 202 provides a mechanism to assign the RDMA queue pairs to the Virtual Function's virtual traffic classes, based on criteria from the guest operating system in virtual machine 220 or RDMA application.

Figure 7:
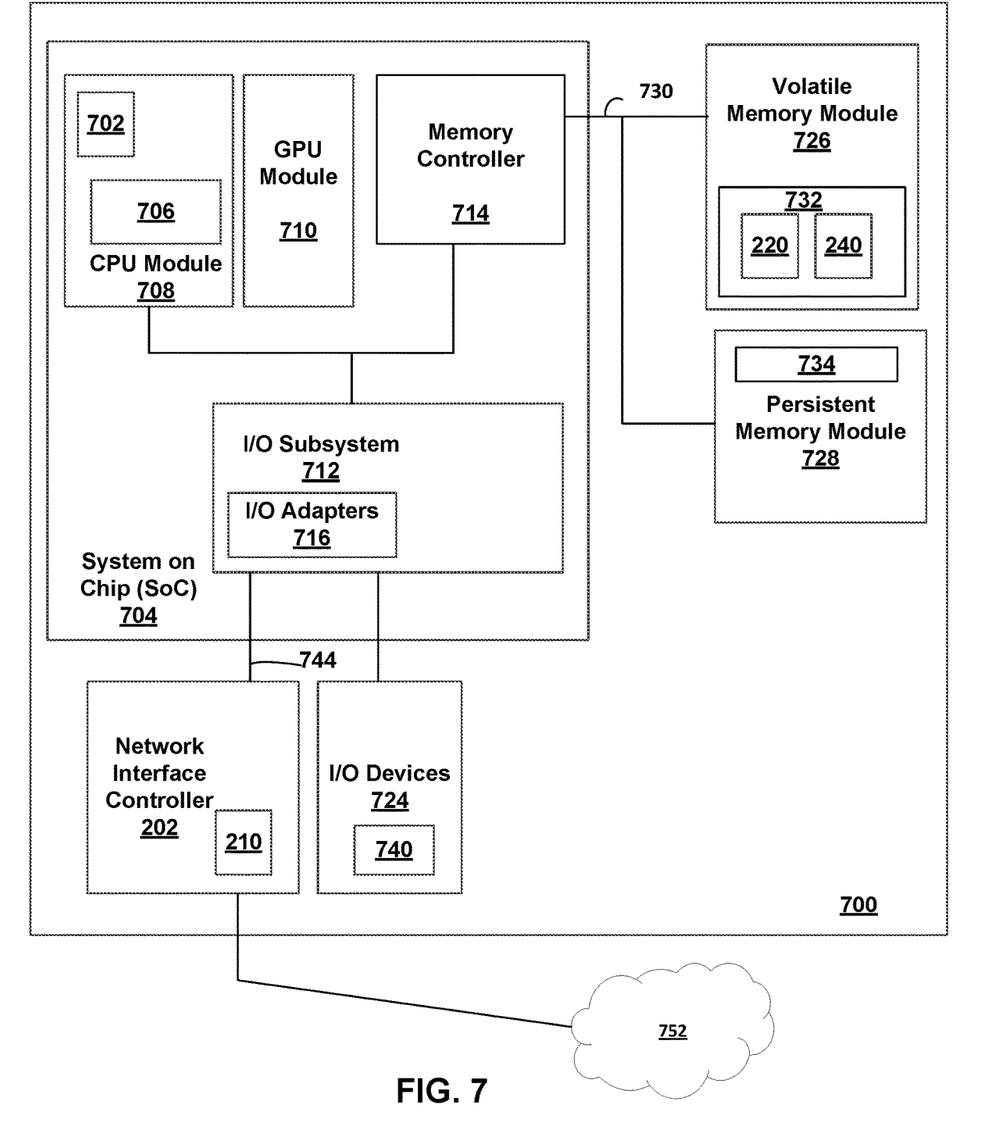
FIG. 7 is a block diagram of an embodiment of a server in a cloud computing system.

FIG. 7 is a block diagram of an embodiment of a server 700 in a cloud computing system. Server 700 includes a system on chip (SOC or SoC) 704 which combines processor, graphics, memory, and Input/Output (I/O) control logic into one SoC package. The I/O adapters 716 may include a Peripheral Component Interconnect Express (PCIe) adapter that is communicatively coupled over bus 744 to a network interface controller 202.

The SoC 704 includes at least one Central Processing Unit (CPU) module 708, a memory controller 714, and a Graphics Processor Unit (GPU) module 710. In other embodiments, the memory controller 714 may be external to the SoC 704. The CPU module 708 includes at least one processor core 702 and a level 2 (L2) cache 706.

Although not shown, the processor core 702 may internally include one or more instruction/data caches (L1 cache), execution units, prefetch buffers, instruction queues, branch address calculation units, instruction decoders, floating point units, retirement units, etc. The CPU module 708 may correspond to a single core or a multi-core general purpose processor, such as those provided by Intel® Corporation, according to one embodiment. In an embodiment the SoC 704 may be an Intel® Xeon® Scalable Processor (SP) or an Intel® Xeon® data center (D) SoC.

The memory controller 714 may be coupled to a persistent memory module 728 and a volatile memory module 726 via a memory bus 730. The volatile memory module 726 includes one of more volatile memory integrated circuits 732. The persistent memory module 728 may include one or more persistent memory device(s) 734. The volatile memory module 626 and persistent memory module 628 can be a dual-in-line memory module (DIMM) or a small outline dual in-line memory module (SO-DIMM).

The Virtual Function driver 244 and Physical Function driver 242 may be stored in volatile memory integrated circuits 732 in the volatile memory module 726. In another embodiment the Virtual Function driver 244 and Physical Function driver 242 may be stored in persistent memory device(s) 734 in the persistent memory module 728.

In an embodiment, the Virtual Function driver 244 in virtual machine 220 and the Physical Function driver 242 in host operating system 240 may be included in operating systems such as Microsoft® Windows® (Network Driver Interface System (NDIS) or NetAdapter drivers), Linux® and VMware® ESX.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

Volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/Output version 2, JESD229-2 originally published by JEDEC in August 2014, HBM (High Bandwidth Memory, JESD325, originally published by JEDEC in October 2013, DDR5 (DDR version 5, currently in discussion by JEDEC), LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

The Graphics Processor Unit (GPU) module 710 may include one or more GPU cores and a GPU cache which may store graphics related data for the GPU core. The GPU core may internally include one or more execution units and one or more instruction and data caches. Additionally, the Graphics Processor Unit (GPU) module 710 may contain other graphics logic units that are not shown in FIG. 1, such as one or more vertex processing units, rasterization units, media processing units, and codecs.

Within the I/O subsystem 712, one or more I/O adapter(s) 716 are present to translate a host communication protocol utilized within the processor core(s) 702 to a protocol compatible with particular I/O devices. Some of the protocols that I/O adapter(s) 716 may be utilized for translation include Peripheral Component Interconnect (PCI)-Express (PCIe); Universal Serial Bus (USB); Serial Advanced Technology Attachment (SATA) and Institute of Electrical and Electronics Engineers (IEEE) 1594 "Firewire".

The I/O adapter(s) 716 may communicate with external I/O devices 724 which may include, for example, user interface device(s) including a display and/or a touch-screen display 740, printer, keypad, keyboard, communication logic, wired and/or wireless, storage device(s) including hard disk drives ("HDD"), solid-state drives ("SSD") 718, removable storage media, Digital Video Disk (DVD) drive, Compact Disk (CD) drive, Redundant Array of Independent Disks (RAID), tape drive or other storage device. The storage devices may be communicatively and/or physically coupled together through one or more buses using one or more of a variety of protocols including, but not limited to, SAS (Serial Attached SCSI (Small Computer System Interface)), PCIe (Peripheral Component Interconnect Express), NVMe (NVM Express) over PCIe (Peripheral Component Interconnect Express), and SATA (Serial ATA (Advanced Technology Attachment)).

Additionally, there may be one or more wireless protocol I/O adapters. Examples of wireless protocols, among others, are used in personal area networks, such as IEEE 802.15 and Bluetooth, 4.0; wireless local area networks, such as IEEE 802.11-based wireless protocols; and cellular protocols.

It is envisioned that aspects of the embodiments herein may be implemented in various types of computing and networking equipment, such as switches, routers and blade servers such as those employed in a data center and/or server farm environment. Typically, the servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers.

Each blade comprises a separate computing platform that is configured to perform server-type functions, that is, a "server on a card." Accordingly, each blade includes components common to conventional servers, including a main printed circuit board (main board) providing internal wiring (i.e., buses) for coupling appropriate integrated circuits (ICs) and other components mounted to the board. These components may include the components discussed earlier in conjunction with FIG. 7.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope.

Therefore, the illustrations and examples herein should be construed in an illustrative, and not a restrictive sense. The scope of the invention should be measured solely by reference to the claims that follow.

What is claimed is:

1. An apparatus comprising:
   a virtual machine with data center bridging (DCB) support in a multi-tenant environment;
   circuitry to map a first traffic class to a second traffic class, the second traffic class hidden from a virtual machine; and
   a physical function driver to send a message via a secure mailbox queue to a virtual function driver of the virtual machine to pause send and receive in packet queues, in response to a change in configuration of physical Data Center Bridging.

2. The apparatus of claim 1, further comprising:
   the physical function driver to allocate queues for a virtual function driver in the virtual machine.

3. The apparatus of claim 1, wherein a virtual machine includes the virtual function driver and virtual function traffic classes and queues, physical traffic classes and queues to map to the virtual function driver via an indexed table, such that the virtual function driver to access a contiguous set of queues.

4. The apparatus of claim 1, further comprising:
   the physical function driver to send a message to a Virtual Function driver in the virtual machine to pause all traffic and disable queues while Virtual Function traffic classes and queues are reconfigured in a Virtual Function driver.

5. The apparatus of claim 1, wherein the circuitry to access
   a first queue to store a packet having a first user priority;
   a second queue; and
   a table to store a second user priority and to map the second user priority to the first user priority, the circuitry to replace the first user priority in the packet with the second user priority and to move the packet from the first queue to the second queue.

6. The apparatus of claim 5, wherein the first user priority to map to the first traffic class and the second user priority to map to the second traffic class.

7. A method comprising:
providing data center bridging (DCB) support in a virtual machine in a multi-tenant environment;
mapping a first traffic class to a second traffic class, the second traffic class hidden from a virtual machine; and
sending, by a physical function driver, a message via a secure mailbox queue to a virtual function driver of the virtual machine to pause send and receive in packet queues in the virtual function driver, in response to a change in configuration of physical Data Center Bridging.

8. The method of claim 7, further comprising:
allocating queues for a virtual function driver in the virtual machine.

9. The method of claim 7, further comprising:
mapping physical traffic classes and queues to the virtual function driver in a virtual machine via an indexed table, such that the virtual function driver to access a contiguous set of queues.

10. The method of claim 7, further comprising:
sending, by the physical function driver, a message to the virtual function driver in the virtual machine to pause all traffic and disable queues while Virtual Function traffic classes and queues are reconfigured in the Virtual Function driver in the virtual machine.

11. The method of claim 7, further comprising:
storing in a packet having a first user priority in a first queue; and
storing, in a table, a second user priority to map to the first user priority;
replacing the first user priority in the packet with the second user priority; and
moving the packet from the first queue to a second queue.

12. The method of claim 11, further comprising:
mapping the first user priority to map to the first traffic class and the second user priority to map to the second traffic class.

13. A system comprising:
a memory module, the memory module comprising at least one volatile memory integrated circuit, the volatile memory integrated circuit to store a packet;
a virtual machine with data center bridging (DCB) support in a multi-tenant environment;
circuitry to map a first traffic class in the packet to a second traffic class, the second traffic class hidden from a virtual machine; and
a physical function driver to send a message via a secure mailbox queue to a virtual function driver of the virtual machine to pause send and receive in packet queues, in response to a change in configuration of physical Data Center Bridging.

14. The system of claim 13, further comprising:
the physical function driver to allocate queues for a virtual function driver in the virtual machine.

15. The system of claim 13, wherein a virtual machine includes the virtual function driver and virtual function traffic classes and queues, physical traffic classes and queues to map to the virtual function driver via an indexed table, such that the virtual function driver to access a contiguous set of queues.

16. The system of claim 13, further comprising:
the physical function driver to send a message to a Virtual Function driver in the virtual machine to pause all traffic and disable queues while Virtual Function traffic classes and queues are reconfigured in a Virtual Function driver.

17. The system of claim 13, wherein the circuitry to access
a first queue to store a packet having a first user priority;
a second queue; and
a table to store a second user priority and to map the second user priority to the first user priority, the circuitry to replace the first user priority in the packet with the second user priority and to move the packet from the first queue to the second queue.

18. The system of claim 17, wherein the first user priority to map to the first traffic class and the second user priority to map to the second traffic class.

19. One or more non-transitory machine-readable storage media comprising a plurality of instructions stored thereon that, in response to being executed, causes a computing device to:
provide data center bridging (DCB) support in a virtual machine in a multi-tenant environment;
map a first traffic class to a second traffic class, the second traffic class hidden from a virtual machine; and
send, by a physical function driver, a message via a secure mailbox queue to a virtual function driver of the virtual machine to pause send and receive in packet queues, in response to a change in configuration of physical Data Center Bridging.

20. The one or more non-transitory machine-readable storage media of claim 19, wherein the plurality of instructions further causes the computing device to:
allocate queues for a virtual function driver in the virtual machine.

21. The one or more non-transitory machine-readable storage media of claim 19, wherein the plurality of instructions further causes the computing device to:
map physical traffic classes and queues to the virtual function driver in a virtual machine via an indexed table, such that the virtual function driver to access a contiguous set of queues.

22. The one or more non-transitory machine-readable storage media of claim 19, wherein the plurality of instructions further causes the computing device to:
send, by the physical function driver, a message to the virtual function driver in the virtual machine to pause all traffic and disable queues while Virtual Function traffic classes and queues are reconfigured in the Virtual Function driver in the virtual machine.

23. The one or more non-transitory machine-readable storage media of claim 19, wherein the plurality of instructions further causes the computing device to:
store in a packet having a first user priority in a first queue; and
store, in a table, a second user priority to map to the first user priority;
replace the first user priority in the packet with the second user priority; and
moving the packet from the first queue to a second queue.

24. The one or more non-transitory machine-readable storage media of claim 23, wherein the plurality of instructions further causes the computing device to:
map the first user priority to the first traffic class and the second user priority to the second traffic class.

* * * * *